Figure 1:
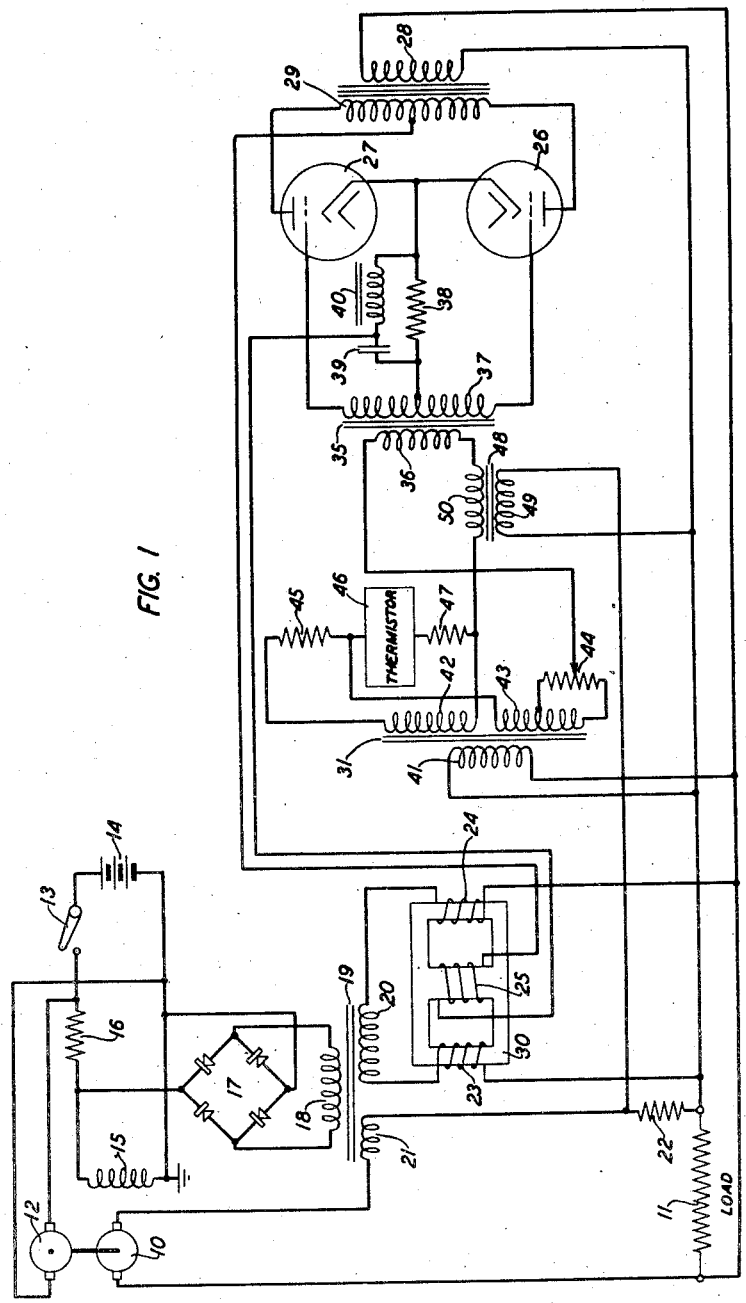

Feb. 10, 1948. W. H. BIXBY 2,435,573
VOLTAGE REGULATION
Filed Jan. 31, 1945 3 Sheets-Sheet 1

INVENTOR
W. H. BIXBY
BY
G. F. Heuerman
ATTORNEY

INVENTOR
W. H. BIXBY
BY
G. F. Heuerman
ATTORNEY

Patented Feb. 10, 1948

2,435,573

UNITED STATES PATENT OFFICE 2,435,573

VOLTAGE REGULATION

William H. Bixby, Detroit, Mich., assignor to Donald R. Middleton and Stanley M. Hanley, doing business as Power Equipment Company, Detroit, Mich., a co-partnership Application January 31, 1945, Serial No. 575,464

21 Claims. (Cl. 323—89)

1

This invention relates to voltage regulation and particularly to apparatus for controlling the energization of a field winding of a generator to control its output voltage.

An object of the invention is to provide novel apparatus for controlling the output voltage of an alternator which supplies current to a load to minimize load voltage changes.

Another object is to provide a novel voltage regulating circuit arrangement which is relatively insensitive to changes in frequency and wave form of the current supplied to the load.

In accordance with specific embodiments of the invention shown and described herein for the purpose of illustration the direct current supplied to a field winding of an alternator for supplying alternating current to a load is controlled in a manner to maintain the load voltage substantially constant. A first rectifier which supplies direct current to the alternator field winding has its input connected through the alternating current winding of a reactor to an alternating current source. The reactor is provided with a second winding for controlling the impedance of the first winding and therefore the energization of the generator field winding under control of direct current supplied to said second reactor winding from a second rectifier. The second rectifier comprises an electric discharge device having a control circuit upon which a control voltage is impressed for controlling the direct current supplied by the rectifier to the second winding of the reactor.

The control voltage for the second rectifier is a voltage having three alternating components, a first of said components being proportional to load voltage and a second of said components being proportional to load current. The third component alternating voltage is set up by impressing a voltage derived from the load voltage across a circuit comprising in series a resistor and a resistance means, said resistance means comprising a device, preferably a thermistor, having the characteristic that its resistance decreases in response to an increase of alternating current therethrough at such a rate that the voltage across it decreases. Alternatively, the rectified current supplied to the second reactor winding may be controlled by the anode-cathode resistance of a regulator electronic device, said resistance being varied in response to changes of said control voltage.

However it is not necessary to employ, in the circuit for setting up the third component alternating voltage, a fixed resistor and a resist-

2 ance means the voltage across which decreases in response to an increase of alternating current therethrough. It is only required that the branch circuit comprises a resistance device the resistance of which changes in a consistent, non-linear manner with changing effective current in the circuit. That is, the voltage across the device must not be proportional to the current through the device. The only advantage to be gained from the use of a device the voltage across which decreases with increasing current therethrough is to make possible the use of a voltage amplifying circuit of relatively smaller gain while maintaining the load voltage within certain desired limits. The use of a non-ohmic resistance device the voltage across which increases with increasing current therethrough has other advantages and the use of such a device is therefore preferred in some cases. There are shown and described herein several typical circuit arrangements which are modifications of the arrangement described in the preceding paragraphs, for utilizing the sum of at least two alternating voltage components which are opposed in phase, one of the two components varying linearly with load voltage and the other component varying non-linearly with load voltage, for obtaining a resultant control voltage. The resultant control voltage may be used for controlling the direct current supplied to the direct current winding of a reactor to control the impedance of the alternating current reactor winding which in turn controls the direct current supplied to the field winding of an alternator.

Figure 2:
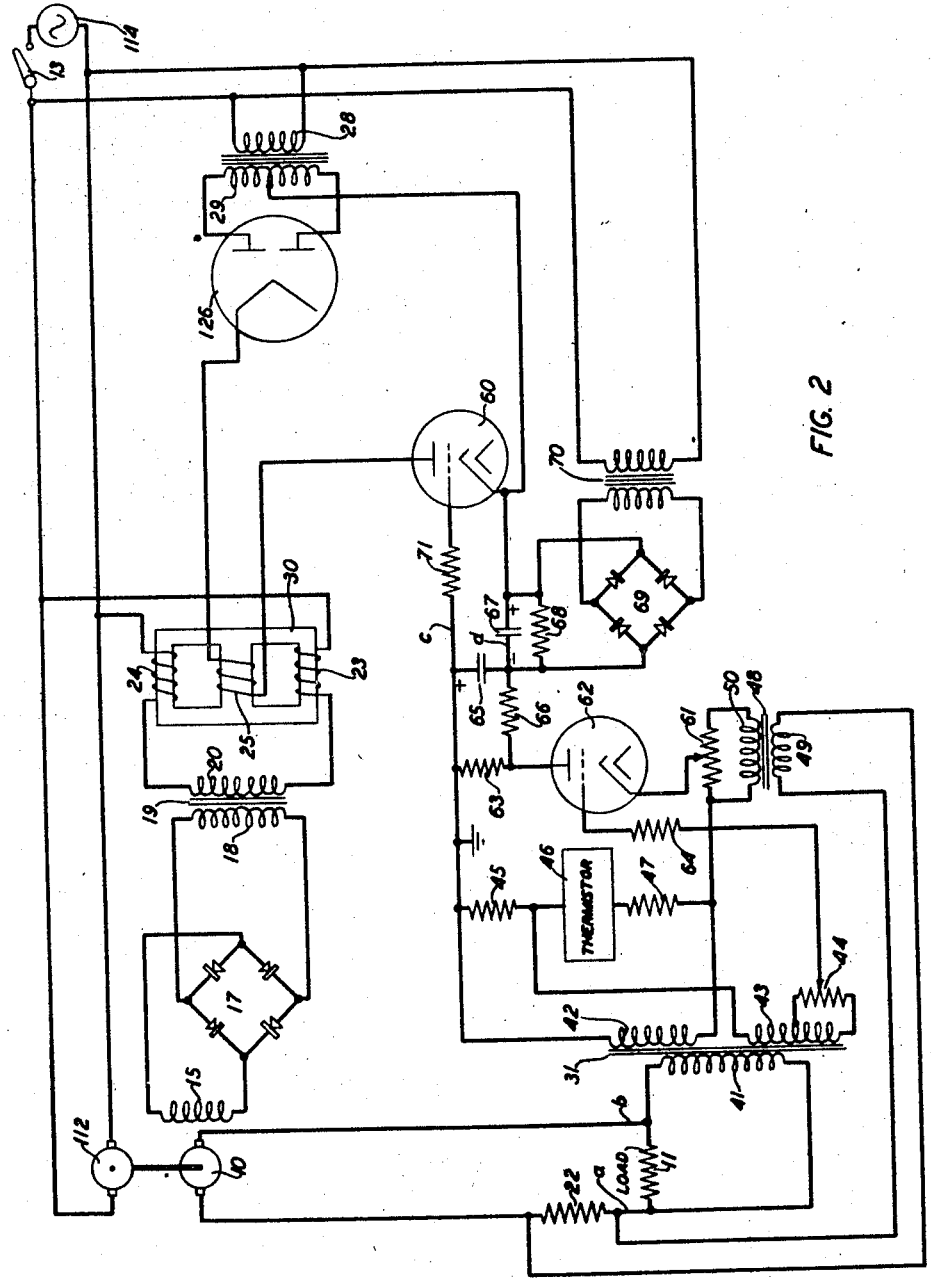
Figure 3:
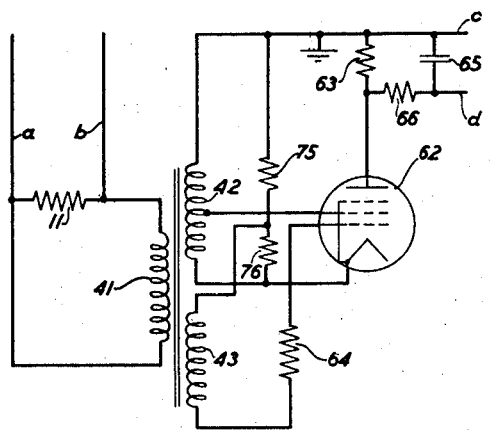
Figure 5:
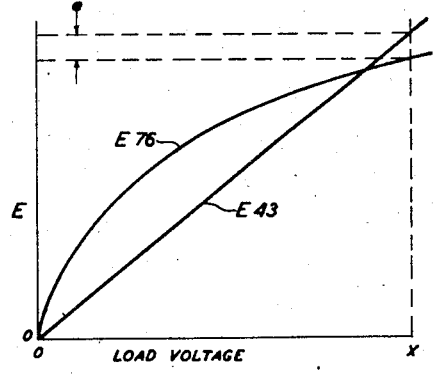
Figure 4:
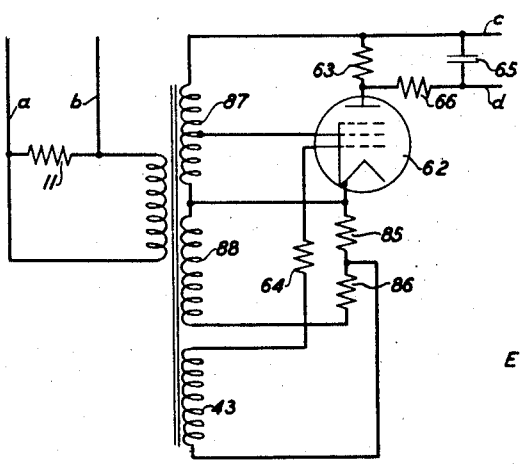
Figure 6:
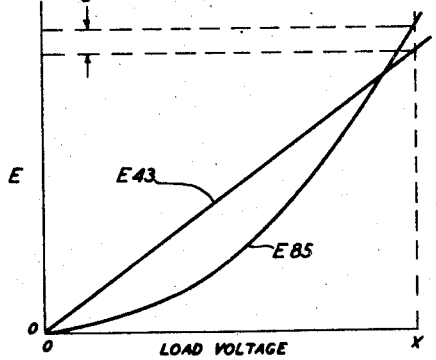

Fig. 1 of the accompanying drawing is a diagrammatic view of a voltage regulator for an alternator embodying the invention;

Fig. 2 is a diagrammatic view of a modification of the regulator shown in Fig. 1;

Figs. 3 and 4 are diagrammatic views of modifications of a portion of the voltage regulator shown in Fig. 2; and Figs. 5 and 6 are graphs to which reference will be made in describing the arrangements shown in Figs. 3 and 4.

Referring to Fig. 1 of the drawing, there is disclosed an alternating current generator 10 for supplying alternating current, having a frequency of 400 cycles per second, for example, to a load 11, the generator being driven by a direct current motor 12 which is energized, upon closure of a switch 13, by current from a direct current supply source 14. Current from source 14 is also supplied to a field winding 15 of generator 10 through a series resistor 16, the negative terminal of winding 15 being grounded. The resistor 16 is adjusted so that when current is supplied to winding 15 from source 14 only, when the voltage of source 14 has a maximum value and when the load 11 is light, that is, when its resistance is a maximum, the voltage across load 11 is slightly below the required operating value. The additional exciting current required to be supplied to the field winding 15 to bring the load voltage up to its operating value is supplied from a bridge rectifier 17 having its output terminals connected across the field winding 15 and its input terminals connected to a secondary winding 18 of a transformer 19, the transformer also having a primary winding 20 and a tertiary winding 21. The tertiary winding 21 and a load compounding resistor 22 are connected in series with the load in one side of the line which supplies current from the generator 10 to the load 11. Alternating current from generator 10 is supplied to primary winding 20 through a line connected to the load terminals and through the alternating current windings 23 and 24 of a reactor, these windings being wound upon the outer legs of a three-legged core 30. The reactor also comprises a saturating winding 25 wound on the middle leg of core 30 for controlling the impedance of windings 23 and 24 in accordance with the direct current energization of winding 25. The turns of transformer winding 20 are adjusted to give as much compounding as possible while maintaining the load voltage below the normal operating voltage by a small margin, say five per cent, when the saturable reactor comprising core 30 is unsaturated.

Direct current is supplied to winding 25 of the reactor from a rectifier comprising electric discharge tubes 26 and 27 each having an anode, a cathode and a control electrode. Alternating current is supplied to the rectifier from a line connecting the load terminals to the primary winding 28 of a transformer having a secondary winding 29. The end terminals of winding 29 are connected to the anodes respectively of tubes 26 and 27 and a mid-terminal of transformer winding 29 is connected to a terminal of reactor winding 25. The direct current supplied to winding 25 from the rectifier is controlled in response to a control voltage impressed upon the control grid-cathode paths of tubes 26 and 27 through an input transformer 35 having a primary winding 36 and a secondary winding 37. The end terminals of winding 37 are connected to the control grids of tubes 26 and 27 respectively and a mid-terminal of winding 37 is connected to the cathodes of the tubes through a resistor 38, and in parallel therewith, a branch path having a condenser 39 and an inductance element 40 in series. A common terminal of condenser 39 and inductance element 40 is connected to a second terminal of reactor winding 25. The network 38, 39, 40 functions as an anti-hunt circuit.

There is provided a transformer 31 having a primary winding 41 connected across the load terminals and secondary windings 42 and 43, a potentiometer 44 being connected across a portion of winding 43. Across the secondary winding 42 are connected in series a resistor 45, a thermistor 46 and a temperature compensating resistor 47. There is also provided a transformer 48 having a primary winding 49 connected across the load compounding resistor 22 and a secondary winding 50. A circuit may be traced from a terminal of transformer winding 36 through transformer winding 50, compensating resistor 47 and thermistor 46 to a terminal of transformer winding 43 and from an adjustable contact of potentiometer 44 to the other terminal of transformer winding 36.

The thermistor is one having the characteristic that the resistance thereof varies at such a rate in response to amplitude changes of the current therethrough over a certain current range which includes the operating range, that the voltage across the thermistor decreases as the current increases and vice versa. The thermistor is somewhat sluggish in changing its resistance in response to current changes so that its resistance remains nearly constant over the period of a single cycle of alternating current from the generator 10.

The current path including the primary winding 36 of transformer 35, as traced above, thus includes three sources of alternating voltage in series, viz., a first voltage derived from secondary transformer winding 43 which varies in accordance with load voltage changes, a second voltage, that across the combination of thermistor 46 and compensating resistor 47 which falls as the voltage across the load rises, and a third voltage across secondary transformer winding 50 which varies in accordance with changes of load current. The first component voltage is substantially 180 degrees out of phase with respect to each of the remaining component voltages and is of larger amplitude than the sum of the remaining components. The resulting voltage impressed upon the control grid-cathode circuits of each of the rectifier tubes 26 and 27 through transformer 35 is opposed in phase to the anode-cathode voltage, that is, the control grid of tube 27, for example, is negative with respect to its cathode when the anode of the tube is positive with respect to the cathode.

Considering the operation of the voltage regulating circuit, if a small increase in load voltage occurs, the voltage component set up in the transformer winding 43 will increase and that across thermistor 46 and resistor 47 will decrease to cause an increase of the control grid-cathode voltage of tubes 26 and 27. As a result the rectifier current supplied by rectifier 26, 27 to the reactor saturating winding 25 is reduced thus causing an increase in the impedance of reactor windings 23 and 24. The direct current supplied to generator field winding 15 is thus reduced to cause a reduction in load voltage, thereby tending to maintain the load voltage substantially constant. If the load is increased by reducing the resistance of load 11, the voltage across the load compounding resistor 22 and the voltage across each of the windings of transformer 48 are increased. The control grid-cathode voltage of each of rectifier tubes 26 and 27 is thus reduced to cause an increase of the rectified current supplied to reactor winding 25. The impedance of reactor windings 23 and 24 is thus reduced to cause an increase in the direct current supplied to field winding 15. The output voltage of generator 10 is thus increased to substantially prevent a reduction of load voltage due to the increased load and the resulting increased voltage drop in the circuit which connects the generator 10 with the load 11.

In Fig. 2 of the drawing the elements which are like corresponding elements of Fig. 1 are designated by the same numerals. Referring to Fig. 2, the alternating current generator 10 supplies current having a frequency of 400 cycles per second, for example, to a load 11 through a series load compounding resistor 22. the generator being driven by an alternating current motor 112 which, upon closure of switch 13, is energized by current from an alternating current supply source 114 having a frequency of 60 cycles per second, for example. Current from alternating current source 114 is also supplied through the alternating current windings 23 and 24 of a reactor having a core 30 and through transformer 19 to a bridge rectifier 17 which in turn supplies direct current to the generator field winding 15. Direct current is supplied to saturating winding 25 of the reactor from a full wave rectifier 126 through a circuit comprising the anode-cathode path of an electronic device 60 having an anode, a cathode and a control electrode, the rectifier being energized by current from supply source 114 through a transformer 28, 29.

There is provided a transformer 31 having a primary winding 41 connected across the load terminals and secondary windings 42 and 43, a potentiometer 44 being connected across a portion of winding 43. Across the secondary winding 42 are connected in series a resistor 45, a thermistor 46 and a temperature compensating resistor 47. There is also provided a transformer 48 having a primary winding 49 connected across the load compounding resistor 22 and a secondary winding 50 across which is connected a potentiometer 61. There is provided an electronic device 62 having an anode, a cathode and a control electrode, to which space current is supplied from the transformer winding 42 through a circuit comprising a resistor 63, a terminal of which is connected to the anode of tube 62, and a portion of potentiometer 61 to the adjustable contact of which the cathode of tube 62 is connected. A circuit may be traced from the cathode of tube 62 to the adjustable contact of potentiometer 61, through a portion of the potentiometer, compensating resistor 47 and thermistor 46 to a terminal of transformer winding 43 and from the adjustable contact of potentiometer 44 through a resistor 64 to the control grid of tube 62. A condenser 65 and a resistor 66 in series are connected across resistor 63 to form a filter combination with a sufficiently long time constant to maintain stability. A condenser 67, shunted by a resistor 68, is charged by current from a bridge rectifier 69 the input of which is coupled to the alternating current supply source 114 through a transformer 70, thereby providing a bias voltage for tube 60. A circuit connecting the control electrode and cathode of tube 60 comprises in series a resistor 71, condenser 65 and condenser 67, the voltages across condensers 65 and 67, respectively, being of opposite polarity in said circuit.

For the purpose of considering the operation of the voltage regulator of Fig. 2, assume that a small increase in load voltage occurs. As a result the voltage across transformer secondary winding 43 will rise and that across thermistor 46 and resistor 47 will fall to cause a decrease in the amplitude of the space current of tube 62 during the positive half cycles of the voltage impressed upon the anode-cathode circuit from the secondary transformer winding 42. The voltage to which condenser 65 is charged thus decreases to cause the anode-cathode resistance of regulator tube 60 to increase, thereby causing a reduction of the direct current from rectifier 126 flowing through the saturating winding 25 of the reactor. The impedance of windings 23 and 24 is thus increased to cause a reduction of the current supplied from rectifier 17 to the field winding 15 of the alternator, thereby causing a reduction of the load voltage. Changes of load voltage are therefore minimized. A voltage increase, for example, of the alternating current supply source 114 causes an increase of the voltage to which the condenser 67 is charged, thus reducing the current supplied to reactor winding 25 and increasing the impedance of windings 23 and 24 of the reactor. Therefore an increase in the rectified current supplied to field winding 15 due to a voltage increase of supply source 114 is substantially prevented. If there is an increase in load, for example, the voltage across potentiometer 61 is increased to cause a decrease of the control grid-cathode voltage of tube 62 and an increase of anode current. The charge on condenser 65 is therefore increased to cause a decrease of anode-cathode resistance of regulator tube 60 and an increase of the direct current supplied to reactor winding 25, thus reducing the impedance of windings 23 and 24. The energization of field winding 15 is thus increased to cause an increase of the output voltage of generator 10, thereby substantially preventing a decrease of load voltage due to the increased load.

In a specific regulator circuit of the type shown in Fig. 1 and described above, a twin triode tube RCA6N7 was used instead of two separate tubes 26 and 27, as shown in the drawing. The resistance values of resistors 16, 22, 45, 47 and 38 were 50 ohms (adjustable), 0.02 ohm, 7500 ohms, 580 ohms and 10,000 ohms, respectively. Transformer windings 18, 20 and 21 had 73, 220 and 14 turns, respectively. Reactor windings 23, 24 and 25 had 126, 127 and 10,000 turns, respectively. The voltage of direct current supply source 14 was 25 to 28 volts. The load voltage was 115 volts and its frequency was 400 cycles per second. The voltage across transformer winding 42 was 250 volts and that across winding 43 was 60 volts. The ratio of the voltage across transformer winding 49 to that across winding 50 was 1 to 23. The ratio of the voltage across transformer winding 36 to that across each half of winding 37 was 1 to 2. The voltage across each half of transformer winding 29 was 250 volts. The inductance of inductance element 40 was 7 henries. The capacity of condenser 39 was 0.003 microfarad.

In a specific regulator of the type shown in Fig. 2 and described above, tubes 62, 60 and 126 were, respectively, of the RCA 6SQ7, 6B4G and 5Y3–GT types. The source 114 was a 115-volt, 60-cycle source and the load voltage was 115-volt, 400-cycle. The voltage across transformer winding 42 was 250 volts, that across winding 43 was 60 volts. The voltage across the secondary winding of transformer 70 was 75 volts. The voltage across each half of transformer winding 29 was 350 volts. The resistances of resistors 45, 63, 66 and 68 were, respectively, 8000 ohms, 100,000 ohms, 500,000 ohms and 100,000 ohms. The capacitances of condensers 65 and 67 were 20 microfarads and 1 microfarad, respectively.

Measurements made on circuits of the type shown and described above have shown the effective load voltage to remain substantially constant under any pronounced changes of wave shape. The regulator will also be independent of frequency over very wide ranges of variation.

The control circuit shown in Fig. 3 is a modification of a portion of the control circuit shown in Fig. 2, the corresponding circuit elements bearing the same designations in the two figures. Current is supplied by way of leads a, b from the output of alternator 10 to the load 11. While the load compounding obtained in the circuit of Fig. 2, by utilizing the voltage drop across resistor 22, has been omitted from Fig. 3, as well as from Fig. 4, it may obviously be included, if desired. Lead c goes through resistor 71 to the control grid of tube 60 and lead d goes through condenser 67, shunted by resistor 68, to the cathode of tube 60, as shown in Fig. 2. The tube 62 is a pentode the screen grid of which is connected to a tap of transformer winding 42. Resistor 75 has a fixed value of resistance and corresponds to the resistor 45 of Fig. 2. Resistor 76 has a negative temperature coefficient of resistance, its resistance decreasing as the current through the branch 75, 76 increases.

As shown in Fig. 5, the voltage E43 across transformer winding 43 varies linearly with load voltage. The voltage E76 across resistor 76 varies non-linearly with load voltage, the voltage E76 being nearly constant in the region of the normal operating load voltage $x$. The sum of voltages E43 and E76 is impressed upon the control electrode-cathode circuit of tube 62, these voltages being opposed in phase and the voltage E43 being larger than the voltage E76. The phase of the resultant voltage is such that the control grid of tube 62 is negative with respect to the cathode when the anode is positive with respect to the cathode. The resultant voltage e, Fig. 5, increases in response to an increase of load voltage and vice versa. When the load voltage increases, for example, the anode current of tube 62 decreases to make the potential of lead c going to the control electrode of tube 60 relatively less positive with respect to lead d. The impedance of tube 60 is thus increased to cause a reduction of the direct current supplied to reactor winding 25 and therefore a reduction of the direct current excitation of the alternator field winding 15. The initially assumed increase in load voltage is thus minimized or substantially prevented.

In accordance with another embodiment of the invention, resistor 76 of Fig. 3 has a fixed value of resistance and resistor 75 is a resistor, a tungsten filament lamp, for example, having a positive temperature coefficient so that its resistance rises in response to an increase of current therethrough and vice versa. The curves of Fig. 5 also apply to the circuit of Fig. 3 when thus modified. The current through resistor 76 does not increase in proportion to an increase in load voltage because of the increasing resistance of resistor 75. The rate of change of the voltage E76 across resistance element 76 with respect to load voltage therefore decreases as the load voltage is increased, as shown by the curve of Fig. 5. The circuit of Fig. 3 therefore functions in the same manner when element 76 has a constant resistance and element 75 has a resistance which increases with increase of effective current therethrough as it does when element 75 has a constant resistance and element 76 has a resistance which decreases with increasing current therethrough.

The circuit of Fig. 3 may be further modified to produce a larger change in the control grid-cathode voltage e in response to a change of load voltage by employing a positive temperature coefficient resistance element 75 the resistance of which increases in response to an increase of current flowing through it and a negative temperature coefficient resistance element 76 the resistance of which decreases in response to an increase of effective current therethrough. In this case, the decreasing resistance of element 76 will result in a further decrease in the rate of change of voltage E76 with respect to the load voltage as the load voltage is increased or the voltage E76 may even decrease as the load voltage increases over the operating range. The use of a positive temperature coefficient resistor 75 such as a tungsten filament lamp in the circuit of Fig. 3 has the distinct advantage that failure of the lamp element will result in a reduction of load voltage.

Fig. 4 is a further modification of a portion of the regulator circuit shown in Fig. 2. Anode current is supplied to the tube 62 through anode resistor 63 from the secondary transformer winding 87. A tap of transformer winding 87 is connected to the screen grid of the tube. Secondary transformer winding 88 supplies current to the resistor elements 85 and 86 in series, the common terminal of windings 87 and 88 being connected to the cathode.

One terminal of secondary transformer winding 43 is connected through resistor 64 to the control electrode of tube 62 and the other terminal of the winding is connected to the common terminal of resistive elements 85 and 86. When the anode is positive with respect to the cathode of tube 62, the terminal of resistor 85 which is connected to the cathode is positive with respect to its other terminal. The voltage across resistor 85 and that across transformer winding 43 are opposed in phase in the control grid-cathode circuit of tube 62, the voltage across the resistor 85 being larger. Therefore the control grid is negative with respect to the cathode when the anode is positive with respect to the cathode over the operating range of load voltage.

The voltage E43 across the transformer winding 43 is a linear function of the voltage across the load 11, as shown in Fig. 6. The resistor 86 may have a constant value of resistance while the element 85 may have a positive temperature coefficient of resistance so that its resistance increases with increasing effective load voltage. The voltage E85 across resistor 85 is shown in Fig. 6 as being a non-linear function of the load voltage, that is, the rate of change of voltage E85 increases with increasing load voltage. The resultant voltage e in the control grid-cathode circuit of tube 62 increases with increasing load voltage, and vice versa, in the region of the normal load voltage $x$. When the load voltage increases, for example, the control grid of tube 62 becomes relatively more negative with respect to the cathode during the half cycles when the anode of the tube is positive so that the anode current and the voltage drop across the anode resistor 63 decrease. The potential difference between leads c, d is thus reduced to make the control grid of tube 60 relatively less positive or more negative with respect to its cathode. The current supplied to reactor winding 25 is thus reduced to cause a reduction of the direct current excitation of field winding 15 of alternator 10, thereby minimizing the initially assumed rise of load voltage.

Instead of employing resistive elements 85 and 86 having the characteristics described above, resistor 85 may have a fixed resistance and resistor 86 may have a resistance which decreases with increasing root mean square current therethrough. In this case, when the load voltage rises the resistance of element 86 decreases to cause the rate of change of voltage E85 across element 85 to increase with increasing load voltage as shown in Fig. 6.

As a further modification of Fig. 2, there may be employed a resistor 85 having a positive temperature coefficient of resistance and a resistor 86 having a negative temperature coefficient. In this case, the rate of change of voltage E85 will increase with increasing load voltage but this increase is more rapid than in the case where the resistor 85 has a positive temperature coefficient and resistor 86 has a constant value of resistance.

In Fig. 1 likewise, various combinations of elements 45 and 46, 47 having different current-resistance characteristics can be employed. When the load voltage increases, for example, the resistance of element 45 may be constant and that of resistance means 46, 47 may decrease, the resistance of element 45 may increase and that of means 46, 47 may be constant or the resistance of element 45 may increase and that of means 46, 47 may decrease. Moreover, the voltage across resistance means 46, 47 may be made larger than that supplied to the circuit by transformer winding 43. In this case, as the load voltage increases, the resistance of element 45 may be constant and that of means 46, 47 may increase, the resistance of element 45 may decrease and that of means 46, 47 may be constant, or the resistance of element 45 may decrease and that of means 46, 47 may increase.

What is claimed is:

1. Regulating means for controlling the current supplied from an alternating current generator to a load comprising a field winding for said generator, rectifying means for supplying direct current to said field winding in accordance with the amplitude of current from an alternating current source supplied to said rectifier, variable impedance means for controlling the supply of alternating current from said source to said rectifier, means for controlling the impedance of said variable impedance means in accordance with the direct current energization of said impedance control means, a first and a second secondary source of alternating current derived from the current supplied by said generator, the voltage of said secondary sources having variations corresponding to load voltage changes, a circuit connected across said first secondary source comprising in series a resistor and resistance means, said resistance means comprising a device the resistance of which changes over the operating range at such a rate in response to amplitude changes of the alternating current flowing therethrough that the voltage across said device decreases as said current amplitude increases and vice versa, a circuit comprising in series said second secondary source of alternating current and said resistance means for setting up a control voltage having variations corresponding to load voltage changes, the voltage across said second secondary source being in phase opposition to the voltage across said resistance means, means for supplying direct current to said impedance control means and means responsive to said control voltage for controlling the supply of direct current to said impedance control means, thereby controlling the energization of said field winding to minimize load voltage changes.

2. Means for minimizing voltage changes across the load to which current is supplied by an alternator by controlling the energization of a field winding of the alternator comprising a first rectifier for supplying to said field winding direct current the amplitude of which is dependent upon the amplitude of the alternating current supplied to said rectifier, a reactor having a first winding and a second winding, a circuit for supplying alternating current to said rectifier comprising said first winding, a second rectifier to which alternating current is supplied for supplying direct current to said second winding for controlling the impedance of said first winding, resistance means to which current is supplied from said alternator, said resistance means comprising a device the resistance of which changes over the operating range at such a rate in response to amplitude changes of the current therethrough that the alternating voltage across said device decreases as said current increases and vice versa, means to which current is supplied by said alternator for setting up a second alternating voltage which varies due to change of said alternator voltage, means for combining said alternating voltages in opposed phase to set up a resultant alternating voltage, and means under control of said resultant voltage for controlling the amplitude of the direct current supplied by said second rectifier to said second reactor winding, thereby controlling the energization of said field winding to minimize voltage changes of said alternator.

3. Means for minimizing voltage changes across a load to which current is supplied by an alternator by controlling the energization of a field winding of the alternator comprising a rectifier for supplying unidirectional current to said field winding under control of alternating current supplied to said rectifier, a reactor having a first winding in the circuit for supplying current to said rectifier and a second winding to which unidirectional current is supplied for controlling the impedance of said first winding, a first and a second current path across each of which is impressed a voltage proportional to the load voltage, said first current path comprising in series a first resistor and resistance means, said resistance means comprising a device the resistance of which changes over the operating range at such a rate in response to amplitude changes of the current therethrough that the voltage across said device decreases as said current amplitude increases and vice versa, said second current path comprising a second resistor and the anode-cathode path of an electronic device having an anode, a cathode and a control electrode, a circuit connecting the control electrode and cathode of said electronic device comprising said resistance means whereby the voltage across said resistance means is introduced as a first voltage component into said circuit, means for introducing into said circuit a second voltage component proportional to the load voltage and a third voltage component proportional to the load current, the second voltage component being in phase opposition to the first and third voltage components, and means responsive to the voltage across said second resistor for controlling the unidirectional current through said second winding of said reactor for controlling the amplitude of the alternating current supplied to said rectifier, thereby maintaining said load voltage substantially constant.

4. Means for minimizing voltage changes across a load to which current is supplied by an alternator by controlling the energization of a field winding of the alternator comprising a first rectifier for supplying unidirectional current to said field winding under control of alternating current from said alternator supplied to said rectifier, a reactor having a first winding in the circuit through which said alternating current is supplied to said rectifier and a second winding to which unidirectional current is supplied for controlling the impedance of said first winding, a second rectifier to which alternating current is supplied from said alternator for supplying unidirectional current to said second winding, said second rectifier having control means for controlling said unidirectional current in accordance with the alternating voltage impressed upon said control means, a current path having therein in series a resistor, of substantially fixed resistance and resistance means comprising a device the resistance of which changes over the operating range at such a rate in response to amplitude changes of alternating current through said path that the voltage across said device decreases as said current amplitude increases and vice versa, means for supplying current from said alternator to said current path, and means for impressing upon said control means a resultant voltage having as components a first voltage proportional to the voltage across said resistance means, a second voltage proportional to the load voltage and a third voltage proportional to the load current, said second voltage being in phase opposition to said first and third voltages, thereby maintaining said load voltage substantially constant.

5. In combination, an alternator for supplying alternating current to a load and having a field winding, means comprising a rectifier for supplying direct current to said field winding to control the output voltage of the alternator to maintain the load voltage substantially constant, a transformer having three windings a first of which is connected in series with said load with respect to said alternator output and a second of which is connected to the input of said rectifier for supplying alternating current thereto, a reactor having an alternating current winding and a direct current winding to which direct current is supplied for controlling the impedance of said alternating current winding, a circuit connected across said load comprising the third winding of said transformer and the alternating current winding of said reactor in series, means responsive to load current for setting up a voltage proportional to said load current and means responsive to said last-mentioned voltage for controlling the supply of current to the direct current winding of said reactor, thereby controlling the supply of direct current to the field winding of said alternator to cause the load voltage to be maintained substantially constant irrespective of load changes.

6. In combination, an alternator for supplying alternating current to a load and having a field winding, means comprising a rectifier for supplying direct current to said field winding to control the output voltage of the alternator to maintain the load voltage substantially constant, a transformer having three windings a first of which is connected in series with said load with respect to said alternator output and a second of which is connected to the input of said rectifier for supplying alternating current thereto, a reactor having an alternating current winding and a direct current winding to which direct current is supplied for controlling the impedance of said alternating current winding, a circuit connected across said load comprising a third winding of said transformer and the alternating current winding of said reactor in series, a second rectifier for supplying direct current to the direct current winding of said reactor, means for supplying alternating current from said alternator to said second rectifier, said second rectifier comprising a control means upon which a control voltage may be impressed for controlling the direct current supplied by said second rectifier to said reactor winding, and means for setting up said control voltage comprising a second transformer having three windings, a first of said windings being connected across the load, a second of said windings having connected thereacross a first resistor and, in series therewith, a resistance means comprising a device the resistance of which changes over the operating range at such a rate in response to a current change therethrough that the voltage across said device decreases as said current amplitude increases and vice versa, the voltage across the third winding of said second transformer being proportional to load voltage, a second resistor connected in series with said load with respect to said alternator output, a third transformer having a primary winding connected across said second resistor and a secondary winding, a fourth transformer having a primary winding and a secondary winding connected to said control means of said second rectifier, and a circuit connected to the primary winding of said fourth transformer comprising in series said resistance means, the third winding of said second transformer and the secondary winding of said third transformer.

7. In combination, an alternator for supplying alternating current to a load and having a field winding for controlling the output voltage of said alternator in accordance with the energization of said field winding, a first rectifier for supplying direct current to said field winding in accordance with the alternating current supplied to said rectifier, a reactor having an alternating current winding and a direct current winding, means for supplying current from an alternating current supply source to said rectifier through the alternating current winding of said reactor, a second rectifier to which is supplied alternating current from said supply source for supplying direct current to said direct current winding of said reactor and means for controlling the direct current supplied from said second rectifier to said direct current reactor winding comprising an electronic device having an anode, a cathode and a control electrode, means for connecting the anode-cathode path of said device in series with said direct current reactor winding with respect to the output of said second rectifier so that the current supplied to said direct current winding is controlled in accordance with the resistance of said anode-cathode path, a transformer having a primary winding connected across the load and a first secondary winding, means comprising a second secondary winding of said transformer for setting up a voltage proportional to load voltage; a current path connected across said first secondary winding comprising in series a first resistor and resistance means, said resistance means comprising a device the resistance of which changes over the operating range at such a rate in response to amplitude changes of current therethrough that the voltage across said device decreases as said current amplitude increases and vice versa, means for setting up a voltage proportional to load current, a second electronic device having an anode, a cathode and a control electrode, a second current path connected across said first secondary transformer winding comprising in series a second resistor and the anode-cathode path of said second electronic device, a circuit connecting the control electrode and cathode of said second electronic device comprising in series said means for setting up a voltage proportional to load voltage, said means for setting up a voltage proportional to load current and said resistance means, said voltage proportional to load voltage being of opposite phase to each of said remaining voltages in said circuit, a current path connected across said second resistor comprising a condenser which becomes charged due to the voltage drop across said second resistor, and a circuit comprising said condenser connecting the control electrode and cathode of said second electronic device for controlling the anode-cathode resistance of said device in accordance with the voltage to which said condenser is charged, thereby causing the energization of said field winding and the alternator output voltage to be controlled to minimize load voltage changes.

8. The combination with means for supplying alternating voltage from a source to a load, of means for regulating the voltage supplied to the load comprising a transformer having its primary winding connected across said load and having a secondary and a tertiary winding, a first resistance element having the characteristic that the effective voltage thereacross decreases over the operating range with increase of current therethrough and a second resistance element connected in series with said secondary winding, a second transformer, the circuit for said tertiary winding comprising in series said first resistance element and the primary winding of said second transformer, and means under control of the current in the secondary winding of said second transformer for controlling the voltage supplied to said load to minimize changes thereof.

9. Regulating means for controlling the current supplied from an alternating current generator to a load comprising a field winding for said generator, rectifying means for supplying direct current to said field winding in accordance with the amplitude of current from an alternating current source supplied to said rectifier, variable impedance means for controlling the supply of alternating current from said source to said rectifier, means for controlling the impedance of said variable impedance means in accordance with the direct current energization of said impedance control means, a first and a second secondary source of alternating current derived from the current supplied by said generator, the voltage of said secondary sources having variations corresponding to load voltage changes, a current path connected across said first secondary source comprising a first and a second resistance means, one at least of said resistance means having the characteristic that its resistance varies in response to changes of effective current flowing in said path, a circuit comprising in series said second secondary source of alternating current and said second resistance means for setting up a control voltage having variations corresponding to load voltage changes, the voltage across said second secondary source being in phase opposition in said circuit to the voltage across said second resistance means, means for supplying direct current to said impedance control means and means responsive to said control voltage for controlling the supply of direct current to said impedance control means, thereby controlling the energization of said field winding to minimize load voltage changes.

10. Means for minimizing voltage changes across a load to which current is supplied by an alternator by controlling the energization of a field winding of the alternator comprising a first rectifier for supplying to said field winding direct current the amplitude of which is dependent upon the amplitude of the alternating current supplied to said rectifier, a reactor having a first winding and a second winding, a circuit for supplying alternating current to said rectifier comprising said first winding, a second rectifier to which alternating current is supplied for supplying direct current to said second winding for controlling the impedance of said first winding, resistance means to which current is supplied from said alternator for setting up an alternating voltage across a portion thereof, said resistance means comprising a device the resistance of which changes in response to changes of effective current flowing through said resistance means, means to which current is supplied by said alternator for setting up a second alternating voltage which varies due to change of said alternator voltage, means for combining said alternating voltages in opposed phase to set up a resultant alternating voltage, and means under control of said resultant voltage for controlling the amplitude of the direct current supplied by said second rectifier to said second reactor winding, thereby controlling the energization of said field winding to minimize voltage changes of said alternator.

11. Means for minimizing voltage changes across a load to which current is supplied by an alternator by controlling the energization of a field winding of the alternator comprising a rectifier for supplying unidirectional current to said field winding under control of alternating current supplied to said rectifier, a reactor having a first winding in the circuit for supplying current to said rectifier and a second winding to which unidirectional current is supplied for controlling the impedance of said first winding, a first and a second current path across each of which is impressed a voltage proportional to the load voltage, said first current path comprising in series a first resistor and a second resistor, one at least of said resistors having the characteristic that its resistance changes in response to changes of the effective current flowing in said first path, said second current path comprising a third resistor and the anode-cathode path of an electronic device having an anode, a cathode and a control electrode, a circuit connecting said control electrode and cathode comprising said second resistor whereby the voltage across said second resistor is introduced as a first voltage component in said circuit, means for introducing into said circuit a second voltage component proportional to the load voltage and a third voltage component proportional to the load current, the second voltage component being in phase opposition to the first and third voltage components, and means responsive to the voltage across said second resistor for controlling the unidirectional current through said second winding of said reactor for controlling the amplitude of the alternating current supplied to said rectifier, thereby maintaining said load voltage substantially constant.

12. Means for minimizing voltage changes across a load to which current is supplied by an alternator by controlling the energization of a field winding of the alternator comprising a first rectifier for supplying unidirectional current to said field winding under control of alternating current from said alternator supplied to said rectifier, a reactor having a first winding in the circuit through which said alternating current is supplied to said rectifier and a second winding to which unidirectional current is supplied for controlling the impedance of said first winding, a second rectifier to which alternating current is supplied from said alternator for supplying unidirectional current to said second winding, said second rectifier having control means for controlling said unidirectional current in accordance with the alternating voltage impressed upon said control means, a current path having therein in series a first and a second resistive means, one at least of said resistive means having the characteristic that its resistance changes with changes of effective current flowing in said current path to cause to be set up across said second resistive means a voltage which varies non-linearly with the voltage across said current path, means for supplying current from said alternator to said current path and means for impressing upon said control means a resultant voltage having as components a first voltage proportional to the voltage across said second resistive means, a second voltage proportional to the load voltage and a third voltage proportional to the load current, said second voltage being in phase opposition to said first and third voltages, thereby maintaining said load voltage substantially constant.

13. In combination, an alternator for supplying alternating current to a load and having a field winding, means comprising a rectifier for supplying direct current to said field winding to control the output voltage of the alternator to maintain the load voltage substantially constant, a transformer having three windings a first of which is connected in series with said load with respect to said alternator output and a second of which is connected to the input of said rectifier for supplying alternating current thereto, a reactor having an alternating current winding and a direct current winding to which direct current is supplied for controlling the impedance of said alternating current winding, a circuit connected across said load comprising a third winding of said transformer and the alternating current winding of said reactor in series, a second rectifier for supplying direct current to the direct current winding of said reactor, means for supplying alternating current from said alternator to said second rectifier, said second rectifier comprising a control means upon which a control voltage may be impressed for controlling the direct current supplied by said second rectifier to said reactor winding, and means for setting up said control voltage comprising a second transformer having three windings, a first of said windings being connected across the load, a second of said windings having connected thereacross resistive means comprising an element the resistance of which changes in response to a change of effective current flowing through said resistive means, the voltage across said third winding of said second transformer being proportional to load voltage, a resistor connected in series with said load with respect to said alternator output, a third transformer having a primary winding connected across said resistor and a secondary winding, a fourth transformer having a primary winding and a secondary winding connected to said control means of said second rectifier, and a circuit connected to the primary winding of said fourth transformer comprising in series a portion of said resistance means, the third winding of said second transformer and the secondary winding of said third transformer.

14. In combination, an alternator for supplying alternating current to a load and having a field winding for controlling the output voltage of said alternator in accordance with the energization of said field winding, a first rectifier for supplying direct current to said field winding in accordance with the alternating current supplied to said rectifier, a reactor having an alternating current winding and a direct current winding, means for supplying current from an alternating current supply source to said rectifier through the alternating current winding of said reactor, a second rectifier to which is supplied alternating current from said supply source for supplying direct current to said direct current winding of said reactor and means for controlling the direct current supplied from said second rectifier to said direct current reactor winding comprising an electronic device having an anode, a cathode and a control electrode, means for connecting the anode-cathode path of said device in series with said direct current reactor winding with respect to the output of said second rectifier so that the current supplied to said direct current winding is controlled in accordance with the resistance of said anode-cathode path, a transformer having a primary winding connected across the load and a first secondary winding, means comprising a second secondary winding of said transformer for setting up a voltage proportional to load voltage, a current path connected across said first secondary winding comprising in series a first and a second resistor, one at least of said resistors having a resistance which changes with changes of the effective current flowing in said path, the first of said resistors having a different current-resistance characteristic than the second resistor, means for setting up a voltage proportional to the load current, a second electronic device having an anode, a cathode and a control electrode, a second current path connected across said first secondary transformer winding comprising in series a third resistor and the anode-cathode path of said second electronic device, a circuit connecting the control electrode and cathode of said second electronic device comprising in series said means for setting up a voltage proportional to load voltage, said means for setting up a voltage proportional to load current, and said second resistor, said voltage proportional to load voltage being of opposite phase to each of said remaining voltages in said circuit, a current path connected across said third resistor comprising a condenser which becomes charged due to the voltage drop across said third resistor, and a circuit comprising said condenser connecting the control electrode and cathode of said second electronic device for controlling the anode-cathode resistance of said device in accordance with the voltage to which said condenser is charged, thereby causing the energization of said field winding and the alternator output voltage to be controlled to minimize load voltage changes.

15. The combination with means for supplying alternating voltage from a source to a load, of means for regulating the voltage supplied to the load comprising a transformer having its primary winding connected across said load and having a secondary and a tertiary winding, a first and a second resistance element connected in series with said secondary winding, the resistance of one at least of said elements changing with the effective current flowing therethrough, said elements having different resistance-current characteristics respectively, a second transformer, the circuit for said tertiary winding comprising in series said first resistance element and the primary winding of said second transformer, and means under control of the current in the secondary winding of said second transformer for controlling the voltage supplied to said load to minimize changes thereof.

16. A regulating means in accordance with claim 9 in which said first resistance means has a fixed resistance and in which the resistance of said second resistance means decreases as the effective current flowing in said current path increases, and vice versa.

17. Regulating means in accordance with claim 9 in which said second resistance means has a fixed resistance and in which the resistance of said first resistance means decreases as the effective current flowing in said current path increases, and vice versa.

18. Regulating means in accordance with claim 9 in which said first resistance means has a fixed resistance and in which the resistance of said second resistance means increases as the effective current flowing in said current path increases, and vice versa.

19. Regulating means in accordance with claim 9 in which said second resistance means has a fixed resistance and in which the resistance of said first resistance means increases as the effective curernt flowing in said current path increases, and vice versa.

20. Regulating means in accordance with claim 9 in which the resistance of said first resistance means decreases and the resistance of said second resistance means increases as the effective current flowing in said path increases, and vice versa.

21. Regulating means in accordance with claim 9 in which the resistance of said first resistance means increases and the resistance of said second resistance means decreases as the effective current flowing in said path increases, and vice versa.

WILLIAM H. BIXBY.

REFERENCES CITED

The following references are of record in the file of this patent:

UNITED STATES PATENTS

| Number | Name | Date |
| --- | --- | --- |
| 1,710,755 | West | Apr. 30, 1929 |

FOREIGN PATENTS

| Number | Country | Date |
| --- | --- | --- |
| 834,163 | France | Nov. 15, 1938 |